United States Patent

Nyunoya et al.

[15] 3,707,210
[45] Dec. 26, 1972

[54] WHEEL BRAKE CYLINDER ASSEMBLY FOR A HYDRAULIC TWIN BRAKE SYSTEM

[72] Inventors: Mizuo Nyunoya; Masatada Yokoi, both of Kariya, Japan

[73] Assignee: Aisin Seiki Kabushiki Kaisha, Kariya, Aichi Pref., Japan

[22] Filed: Oct. 27, 1970

[21] Appl. No.: 84,291

[30] Foreign Application Priority Data

Oct. 27, 1969 Japan..................................44/85930
Dec. 19, 1969 Japan..............................44/102652

[52] U.S. Cl...............188/345, 60/54.6 M, 91/422, 92/108, 188/151 A, 192/83, 192/85 AA
[51] Int. Cl..............................................B60t 11/00
[58] Field of Search......188/72.5, 345, 106 P, 151 A, 188/196 A, 351; 60/54.6 M; 92/108; 91/422; 192/83, 85 A, 85 AA, 109 F

[56] References Cited

UNITED STATES PATENTS 3,490,565  1/1970  Marschall et al......................188/345
1,980,616  11/1934  Engel............................60/54.6 M X

FOREIGN PATENTS OR APPLICATIONS 599,937  6/1960  Canada...............................188/345

Primary Examiner—George E. A. Halvosa
Attorney—Sughrue, Rothwell, Mion, Zinn & Macpeak

[57] ABSTRACT

A wheel cylinder in a braking system is provided with first and second pistons slidable therein and protruding from opposite ends to actuate the brake elements. An intermediate piston is slidably disposed in the cylinder between the first and second pistons to define first and second fluid pressure chambers disposed in communication with a high pressure system and low pressure system respectively. A third pressure chamber is formed between the intermediate piston and the first piston. A valve in the intermediate piston provides communication between the third pressure chamber and one of the first and second pressure chambers and is normally open when both pressure systems are operative. Upon failure of the high pressure system movement of the intermediate piston in the opposite direction by the low pressure system will close the valve thereby trapping the fluid therein to provide a fluid link between the intermediate piston and the first piston to prevent an increase in stroke when the low pressure system takes over.

6 Claims, 5 Drawing Figures

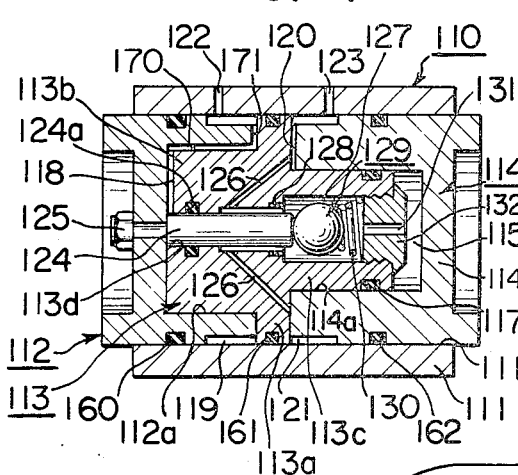
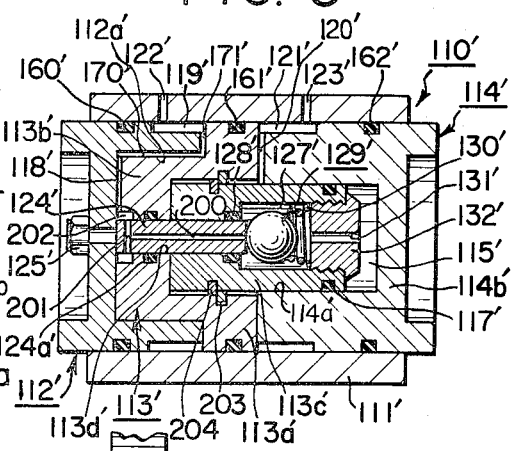
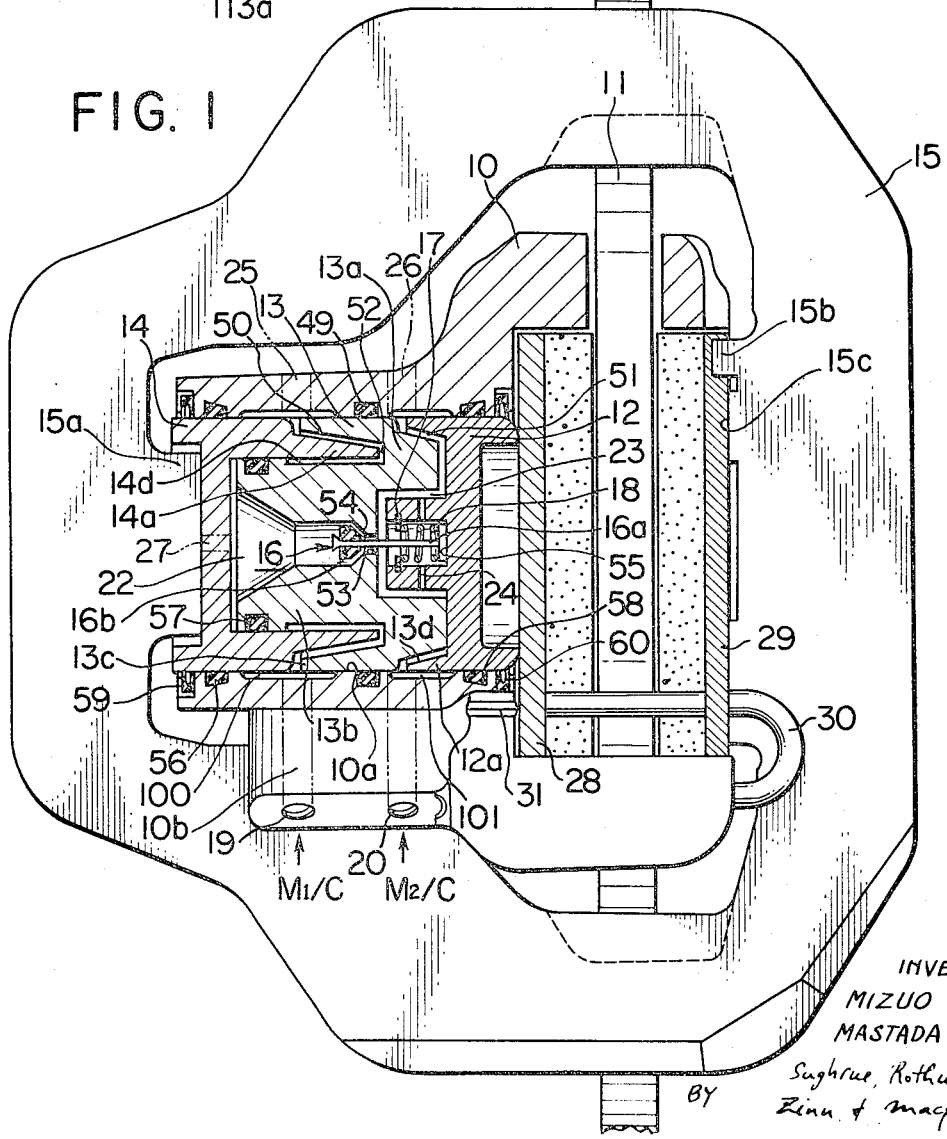

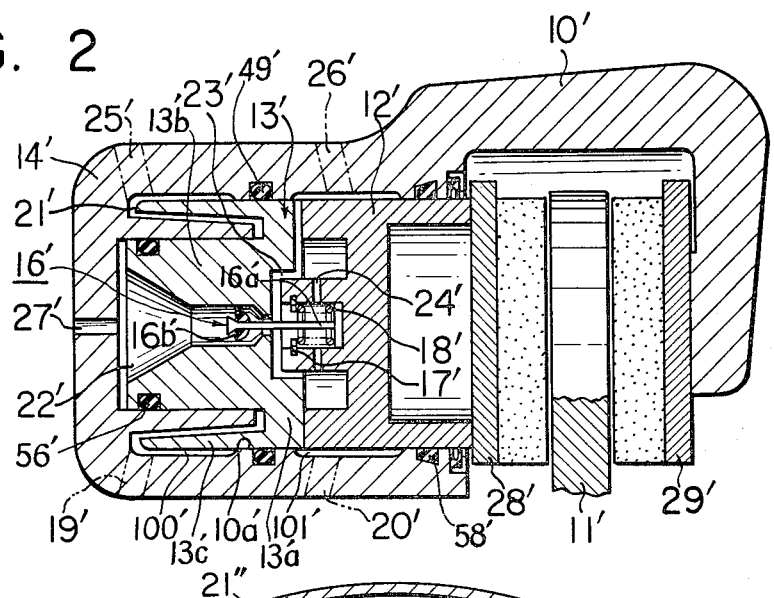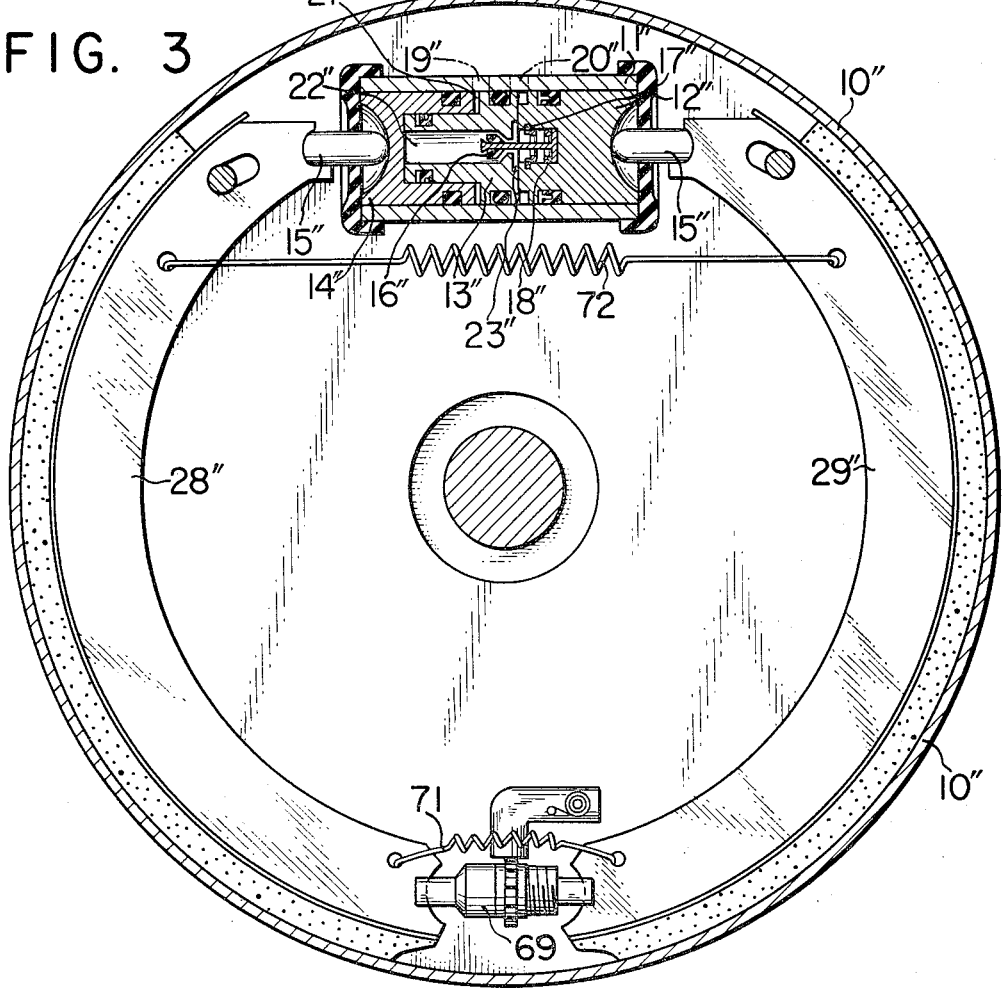

WHEEL BRAKE CYLINDER ASSEMBLY FOR A HYDRAULIC TWIN BRAKE SYSTEM

This invention relates to improvements in and relating to a duplicated hydraulic brake system for a powered and wheeled vehicle, such as an automotive vehicle. More specifically, it relates to a wheel cylinder assembly provided in the hydraulic brake system of the kind referred to above for applying braking force upon the wheel or wheels of the vehicle.

The duplicated hydraulic brake system acting upon at least one of the four or more wheels of the vehicle is hitherto known per se and arranged generally in such manner that the piping system leading from a conventionally known master cylinder to the wheel cylinder which is provided normally in one-to-one relationship with a vehicle wheel for applying brake force thereto, is arranged in duplicate for assuring a safe operation of the brake even in the event of burst in the piping system or the like brake-disabling troubles occurred therein or therewith, a brake application may be nevertheless assured absolutely.

Hydraulic pressure conveyed from the master cylinder through the duplicated pressure oil pipings is introduced in this case into two independent actuating chambers for exerting braking force to the brake shoes or the like braking elements for the related wheel.

Although such braking safety as aimed at is assured with use of this kind of independently duplicated braking system, it is, however, a substantial drawback encountered therewith that in failure of operation of one component system of the duplicated brake pipe lines, an appreciably decreased braking effort only is applied to the brake elements such as shoes.

There are two main classes of the dual brake piping system. One of them is known as the rigid type in which no loss stroke will be encountered even in failure of the operation of one of the duplicated brake pipings. The other of them is known as the floating type in which, however, the loss stroke is rather appreciable in failure of the hydraulic brake pressure supply via one of these brake pipings, although the variation of the brake application effort is substantially small.

Reduction of the brake application effort as met in the rigid type hydraulic braking system will result in not only an appreciable unbalance of the brake application between the front and the rear wheel pair of the vehicle, but also an insufficient braking force applied to the vehicle wheels.

In the case of the floating type, although no problem is practically encountered in case of one of the brake pipings disabled by pipe bursting or the like cause, the quantity of the braking oil to be consumed for performing the braking action is substantially larger, resulting in the employment of a larger size master cylinder, and the brake pedal stroke must be increased appreciably in this case relative to the regular one for performing a certain degree of brake application.

The main object is to provide a dual type hydraulic brake system, capable of obviating the aforementioned conventional drawbacks.

According to the novel teaching of the invention, such improved rigid type brake braking system can be provided as performing the wheel braking action without any appreciable lost stroke and with a possible minimum reduction of the braking pressure, in case of the bursting or the like disabling cause happened to take place in one of the dual brake pipings. On the other hand, when applying the novel teaching of the invention to the conventional floating type brake system, such a brake as capable of performing the braking function with substantially unchanged braking force and a slightest possible lost stroke, in the case of disabling of one of the dual brake pipings.

In addition, the ratio of braking forces can easily be modified in a rigid type braking system, when applied the novel teaching according to this invention thereto.

These and further objects, features and advantages of the invention will become more apparent when read the following detailed description of the invention by reference to the accompanying drawings illustrative of several preferred embodiments shown only by way of example.

In the drawings:

FIG. 1 is substantially a central and axial section of essential parts of a first embodiment of the invention.

FIG. 2 is substantially a central and axial section of a second embodiment of the invention.

FIG. 3 is substantially a sectional view of a third embodiment of the invention.

FIGS. 4 and 5 are axial sections of two modified wheel cylinders employable in any of the foregoing embodiments.

Referring now to FIG. 1 of the accompanying drawings, illustrating the first embodiment of the invention, numeral 10 represents a cylinder body 10 which is fixedly mounted on a certain stationary part, preferably chassis, of a powered and wheeled vehicle, preferably an automotive vehicle, and formed in turn with a bore 10a, a first piston 12, a second piston 13 and a third piston 14 being slidably received therein one after another when seen from right to left in FIG. 1.

The first piston 12 is arranged so as to exert pressure upon a rotatable disc 11 through a conventional brake pad 28, said disc 11 being mechanically connected with a wheel, not shown, of the vehicle, for unitary rotation therewith, when the piston is expanded rightwards, as will be described hereinafter. This mechanical connection of the brake disc 11 with wheel to be braked is highly popular among those skilled in the art so that its structure has been omitted from the drawing only for simplicity. The third piston 14 is rigidly connected with an inward projection 15a of a generally ring-shaped movable plate 15 which has a small inwardly directing projection 15b with a second brake pad 29 arranged in opposition to the first pad 28 at the both sides of the disc 11. The unitary connection of the projection 15b with the pad 29 is also highly conventional so that its detailed structure has been omitted from the drawing only for simplicity. Therefore, the third piston 14 exerts, therefore, pressure through the movable plate 15 and the second pad 29 upon the brake disc 11, when the piston 14 is expanded leftwards, as will be more fully described hereinafter. A flat part 15c of the plate 15 is always kept in contact with the pad 29 from behind.

The second or intermediate piston 13 is formed into a stepped one which comprises a larger or main piston part 13a and a smaller or auxiliary piston part 13b made integral therewith. The smaller piston part 13b cooperates telescopically and sealingly with the third piston 14 which is formed for this purpose with an axial blind bore 14d, a hydraulic working chamber 22 being formed therebetween. Sealing rings 58, 49 and 56 are provided in the inside wall of the cylinder 10 for allowing a sealed sliding movement relative to the cylinder bore 10a for each of the first, second and third pistons, respectively.

Cylindrical projection 13c formed on the intermediate piston 13 is kept normally in opposition to a cylindrical projection 14a formed on the third piston 14 through a narrow cone-shaped gap 50 constituting a part of a working chamber 52 kept in fluid communication therewith. In the similar way, cylindrical projection 12a formed on the first piston 12 is normally kept in opposition to a cone-shaped projection 13d formed on the intermediate piston 13, through a narrow cone gap 51 constituting a working chamber 23 formed between the related two pistons. In this way, a shortest possible overall length of the triple piston arrangement 12–14 is realized.

The working chamber 50; 52 formed thus between the second and third pistons 13 and 14, is kept in fluid communication with the left-hand working chamber 22 through an axial communication passage 53, when a rod valve 16 is kept in separation from its mating seat 54 which is formed in the passage 53, said valve 16 comprising a rod- or stem part the right-hand end of which is kept in pressure engagement with the bottom of an axial recess 55 of first piston 12 urged by a coil spring 18 kept in compression between a snap ring 17 and the right-hand extremity of said stem part 16a. For this purpose, the stem extremity is enlarged as shown. The snap ring 17 is kept in position in the inside wall of said recess 55.

Through a part 10b of cylinder body 10, a pair of ducts 19 and 20 are bored and fluidically connected with a first and second master cylinder of the first and the second or dual brake pipings, although not specifically shown only for simplicity. First duct 19 is kept in fluid communication through an elongated first ring chamber 100 formed in the inside wall of the cylinder bore 10a, with the intermediate working chamber 50;52 between the second and the third piston. In the similar way, second duct 20 is kept in fluid communication through an elongated second ring chamber 101 formed again in the inside wall of the cylinder bore 10a, with the right-hand working chamber 23; 51 between the first and the second piston, thence through the communication duct 53 with the left-hand working chamber 22 when the valve 54 is kept open. Several passages 24–27 are provided as shown for air venting purposes. On the cylindrical projection 13b of intermediate piston 13, a sealing member 57 is provided for providing effective seal thereto relative to the third piston. At the both extremities of the cylinder bore 10 a, dust-prevention seals 59 and 60 are provided, respectively.

An elongated U-bar 30 is mounted fixedly on the cylinder body 10. For this purpose, an engaging pin 31 serves.

Under occasion, one of the first and the third pistons 12 and 14 may be fixedly arranged relative to the cylinder body 10 without loss of the desired function of the triple piston arrangement. As will be described hereinafter more in detail, the novel teaching may equally be applied to the shoe type wheel brake, although the foregoing description has been directed in a specific arrangement embodying a disc type one.

The operation of the first embodiment so far so far shown and described is as follows:

When a conventional foot-operated brake pedal is depressed for applying a braking effort, a tandem or duplicated type master cylinder, not shown, is actuated, and pressure oil is delivered therefrom through respective pipings to the ports 19 and 20, respectively and independently. Now, it is assumed that the oil pressure conveyed to the first port 19 is higher than that conveyed to the second port 20. This higher oil pressure is conveyed through first ring chamber 100 to the intermediate working chamber 50; 52 so that the second and third pistons are forcibly separated from each other.

On the other hand, the lower oil pressure is conveyed from the second port 20 through second ring chamber 101 to the right-hand working chamber 51;23, thence through the passage 53 to the left-hand working chamber 22, thus the second and third pistons are subjected to the hydraulic pressure again in their mutually separating direction. At the same time, the second piston 13 is acted upon the whole area of its right-hand end in the reverse direction by the lower hydraulic pressure supplied from the second master cylinder through the second port 20. In effect, the second or intermediate piston 13 is moved rightwards by the differential pressure acting on its outer ring part 13c, thus the first piston 12 being accompanied by the second piston now moving right-wards. At the same time, the third piston is moved naturally leftwards. Therefore, the left-hand pad 28 is pressed against the disc 11 which is rotating in unison with the vehicle wheel. At the same time, brake pressure is applied by the third piston 14 through the movable plate 15 and the right-hand pad 29 to the disc 11.

It is now assumed that the second brake piping extending from the second master cylinder, not shown, to the second port 20 is subjected to bursting and thus disabled, no hydraulic pressure prevailing in right-hand working chamber 23;51. In this case, the higher hydraulic pressure will naturally be conveyed from the first master cylinder through the first port 19 into the 50;52 as before so that the second and third pistons are separated in their expanding opposite directions thus the braking pressure which is slightly lower than before, being applied to the both brake pads 28 and 29 without inviting appreciable lost stroke.

On the contrary, even when the hydraulic brake pressure to be conveyed through the first port 19 should fail to be fed on account of pipe bursting or the like cause, the braking action can be assured by the lower hydraulic pressure conveyed through the second port 20 into the right-hand and left-hand working chambers 23 and 22. It will be seen that in this case, no relative movement will occur between the second and third piston, but the valve 16 is brought into its closed position cooperating with its seat 53 under the action of the spring 18, so as to isolate the left-hand working chamber 22. Therefore, the pressure oil containing in the last mentioned working chamber 22 will act as a hydraulic link. By the introduction of pressure oil between the first and the second piston, these pistons are naturally brought into separation from each other.

The first piston 12 will exert pressure thus directly upon the left-hand pad 28. Brake pressure will be conveyed from the second piston 13 through the said hydraulic link, the third piston 14 and the movable plate 15 to the right-hand pad 29.

In this way, the braking effect which is substantially similar to that exerted in the regular operational mode of the braking system, can be assured also in this case, but with a certain slight degree of loss stroke.

Next, referring to FIG. 2, the second embodiment will be described in briefly. As may be well supposed, this embodiment has a substantially similar structure and function with those of the first embodiment, although their specific physical configuration may exist between those employed in the both embodiments. Therefore, similar constituent of the present embodiment are denoted with respective same references each attached, however, with a prime for easy comparison and better understanding.

Also in the present second embodiment, as seen, the second or intermediate piston 13' is arranged to cooperate with the first and third pistons 12 and 14 arranged at its both sides. In the present case, however, the cylinder body 10' is made integral with the third piston 14'. For the movable cylinder body 10', there is also provided guide means on a stationary part, such as chassis, of the vehicle, although these means have been omitted for simplicity of the drawing. Except the movable structure of the cylinder body 10', acting as a part of the third piston, the structure and function of the mechanism are substantially same as before and thus, it is believed that no further description would be necessary for better understanding of the invention.

Next, referring to FIG. 3, the third embodiment of the invention as applied to an expandable type shoe brake unit will be described hereinbelow.

In this figure, numerals 28'' and 29'' denotes a pair of conventional expandable shoes adapted for acting as brake elements as in the case of brake pads 28 and 29, respectively. A tension spring 72'' are tensioned between the upper parts of these shoes, the lower and inner ends of which are pivotably mounted by a conventional brake gap adjuster unit 69 constructed in a simple manual type, although the invention can naturally applicable to the automatic gap adjuster 10'' represents a conventional brake drum which is rotatable with the vehicle wheel to be braked, thus acting as a brake torque-receiving member as the brake disc 11 shown in FIG. 1. In close proximity of the adjuster unit 69, there is provided an auxiliary tension spring 72 which are tensioned between the lower ends of the brake shoes 28'' and 29'', so as to keep these shoe ends in pressure and pivotable engagement with the both axial ends of the gap adjuster 69. The upper inner ends of these shoes are kept in pressure engagement through a pair of motion-transmitting rods denoted a common numeral 15'' with the first and third pistons 12'' and 14'' which are similar to those denoted 12 and 14 in the foregoing first embodiment. Between these pistons, a second or intermediate piston 13'' is provided in a telescopically cooperating manner therewith, all the pistons being slidably mounted in a stationary cylinder body 11'' which is designed and arranged as that shown at 10 in the foregoing. Rod valve 16'' corresponds to that shown at 16 in the foregoing. Snap ring stopper 17'' is provided for spring 18'' as before. The right-hand working chamber formed between the first and the second piston is shown at 23'' which corresponds to that shown at 23 in the foregoing. Left-hand working chamber 22'' is provided with the second or intermediate piston 13'' and the third piston 14'' as before. The first and second ports 19'' and 20'' which are designed and arranged in the similar way with those shown at 19 and 20, respectively, in the foregoing.

It will be easily understood from the foregoing that the wheel cylinder assembly according to the present embodiment can operate with the expandable shoe type brake in the desired manner.

Referring next to FIG. 4, the fourth embodiment of the wheel cylinder assembly according to the invention will be described in detail hereinbelow.

The wheel cylinder assembly, generally shown at 110, comprises a hollow cylinder 111 in which a left-hand piston 112 is slidably mounted. In the middle part of the cylinder 111 an intermediate piston 113 is mounted again slidably in the bore 111a of the cylinder 111. Further, a right-hand piston 114 is equally mounted slidably in the same bore 111a. The intermediate piston 113 is formed in its longitudinal section into substantially a cross having a main part 113a, a leftwardly extending piston part 113b which is telescopically arranged within a concentric recess 112a formed concentrically in the left-hand piston 112, as shown. The intermediate piston 113 is further formed with a rightwardly projecting cylinder-like part 113c which is telescopically coupled with a concentric recess 114a formed in the right-hand piston 114. Within the recess 114a and between the right-hand end of piston part 113b and the web part 114b of the right-hand piston 114, a working chamber 115 is formed for ensuring a slidable, yet sealed-off relationship between the intermediate and right-hand side pistons, the piston part 113c being provided with a ring 117 acting as a sealing means for this purpose. Between the left-hand piston and the intermediate piston, there is provided a first working chamber 118 which is fluidically connected with a chamber 119 formed between the left-hand piston 112 and the bore wall 111a of the cylinder 111, and through ducts 170 and 171. The chamber 119 is kept in fluid communication with a first lateral port 122 which is drilled through the wall of cylinder 111.

A laterally extending ring-shaped second working chamber 120 is formed between the main part 113a of the intermediate piston 113 and the right-hand piston 114, and fluidically connected directly with an axially extending chamber 121 formed between the right-hand piston and the inside wall surface of cylinder 111. This chamber 121 is connected directly and fluidically with a second port 123 which is drilled again through the wall of the cylinder 111.

An axially extending plunger 124 is fixed at its outer end or root part with the left-hand piston 112 by a screw nut 125 and in a sealed manner, although the sealing means has been omitted from the drawing only for simplicity. The plunger 124 extends axially and inwardly through substantial part of the intermediate piston 113 into a chamber 127 formed concentrically in the piston part 113c, when the wheel cylinder assembly is positioned as shown.

For attaining a slidable, yet sealed cooperation between plunger 124 and intermediate piston 113, a sealing ring 124a is provided on the inside bore wall surface 113d of the latter.

A valve ball 129 is provided in the chamber 127 and kept in pressure contact with the inner end surface of plunger 124 by a back-up spring 130, a valve seat 128 adapted for cooperation with the valve ball 129 is provided at the innermost end extremity of the bore 113d. When the twin hydraulic brake system is operating normally and thus, there is no operational failure caused by bursting or the like abnormal or emergency accident, the valve seat 128 is opened as shown. The right-hand end of valve ball containing chamber 127 is closed by a screw plug 132 which is formed with an axially and centrally extending passage 131 bored therethrough.

The ports 122 and 123 are hydraulically connected with a conventional master cylinder means so that in case of an application of brake to the related vehicle wheel to which the wheel cylinder is fitted, a higher hydraulic pressure is conveyed from the master cylinder means to the port 123 and a relative low hydraulic pressure is fed to the port 122, although not specifically shown by virtue of its very popularity among those skilled in the art.

Sealing means 160, 161 and 162 are provided on the piston 112, 113, and 114, respectively, for attaining a sealed and slidable contact thereof with the cylinder 110.

The operation of the fourth embodiment so far shown and described is as follows:

When a brake application is made as conventionary, a hydraulic pressure is conveyed from the master cylinder means through a piping, not shown, connected with the first port 122, thereto, and similarly and simultaneously, a higher hydraulic pressure is conveyed to the second port 123, respectively. On account of the hydraulic pressure conveyed thus to the working chamber 120 being higher than that conveyed to the chamber 118, the left-hand piston 112 is not moved in its outwardly expanding direction, while the intermediate piston 113 is pressurized in the left-hand direction and the hydraulic pressure prevailing in the chamber 120 is conveyed through inclined passage means 126 and bore 113d to the ball valve chamber 127, thence through bore 131 into the chamber 115, thus the right-hand piston 114 mechanically connected to brake shoe, not shown, of the conventional expanding type wheel brake mechanism, not shown, is expanded outwardly in the brake-applying direction. Thus, the desired wheel brake action is performed.

Even when a failure of oil pressure delivery to the port 122 should happen to take place from a certain trouble such as caused by conduit bursting or the like, the braking action can be performed as usual.

Should a failure of pressure oil supply to port 123 occur from piping burst or the like cause, pressure oil is naturally conveyed from port 122 to chamber 118, thereby the left-hand piston 112 which is connected again mechanically with brake shoe means being expanded left-wards in the brake applying direction and at the same time the intermediate piston 113 being shifted rightwards. By this mutual separation of the left-hand and intermediate pistons, plunger 124 is moved leftwards so that valve 129 is brought into pressure abuttment against valve seat 128 under the action of the urging spring 130 for closing the valve opening. Upon closure of this ball valve, pressure oil is confined in the combined chambers 115 and 127, so as to provide a kind of a hydraulic link between the intermediate and the right-hand piston. Therefore, motion is transmitted from the now rightwardly shifting intermediate piston to the right-hand piston which is thus expanded in its brake-applying direction. At this time, this expanding force is equal to that of the intermediate piston 113 now being expanded in the right-hand direction.

Finally, the fifth embodiment of the invention is described by reference to FIG. 5. The present embodiment has a substantially same structure as that of the foregoing fourth embodiment. For easy comparison and better understanding of the invention, same or similar constituents of the present embodiment as those of the fourth embodiment are denoted with respective same references, each being, however, attached with a prime for identification.

The cylinder-shaped piston part 113c in the fourth embodiment has been separated from the second or intermediate piston in the present fifth embodiment, so as to provide an auxiliary piston 113c' having an axial stepped bore 113d' and the enlarged portion thereof constituting a valve chamber 127' containing shiftably a ball valve 129' backed up by a spring 130'. Valve seat 128' similar to that denoted 128 in the foregoing is provided so as to cooperate with the ball valve 129'.

Plunger 124', the right-hand end of which is kept in pressure engagement with the ball valve 129', is formed with an axial bore 200 the left-hand end of which is kept in fluid communication with a lateral duct 201 bored laterally through the plunger 124'. The right-hand end of the axial bore 200 is kept in fluid communication through inclined communication passages 141' with the interior of said valve chamber 127'. As shown, the valve 129' is kept in its open position. Therefore, it will be seen that the working chamber 118' is normally kept in fluid communication with the ball valve chamber 127'. At the right-hand end, this chamber 127' is kept in fluid communication with an axial passage 131' with the chamber 115'.

The operation of the present embodiment is as follows:

Brake pressures coming from the tandem master cylinder, not shown, are fed in the brake application period to respective ports 122' and 123', as before, thence to the working chambers 118', 115' and 120', respectively, When assuming, the hydraulic pressure supplied to the port 123' is higher than that fed to the port 122', the chamber 118' is not caused to expand in its volume, while the chambers 120' and 115' are caused to expand in their respective volumes, as in the foregoing fourth embodiment. Therefore, the second or intermediate piston 113', the auxiliary piston 113c' and the first piston 112' are caused to move leftwards in unison with each other, so as to perform an expanding movement for the application of a braking pressure as before. At the same time, the third or right-hand side piston 114' will be caused to expand rightwards as before, so as to perform an oppositely directing braking function.

Now it is assumed that the brake pressure conveyed to the second port 123' should fail to be delivered. Oil pressure is, however, supplied to the working chamber 118' so that the left-hand piston 112' and the intermediate piston 113' are separated from each other, resulting in the plunger valve 124' being caused to separate from the ball valve 129' and the latter being brought into engagement with the valve seat 128'. In this way, the pressure oil prevailing in the chambers 127' and 115' is confined so as to provide a hydraulic link. Therefore, the oil pressure supplied to the working chamber 118' and acting upon the intermediate piston 113' is transmitted to the right-hand piston 114', or more specifically on the main piston part 114$b'$ thereof. In this way, the desired braking action is assured.

At this time, when a gap should exist between the intermediate piston and the right-hand piston, the aimed hydraulic link can nevertheless be provided form the beginning.

On the other hand, when it is assumed that the pressure oil supply should fail to the first port 122', the oil pressure supplied to the chamber 120' through the second port 123' will cause the intermediate piston 113' and left-hand piston 112' to expand leftwards in unison and the right-hand piston 114' is caused to expand rightwards for performing the desired brake function.

What is claimed is:

1. A wheel cylinder assembly for a braking system having braking means comprising a hollow cylinder, first and second piston means located in said cylinder for actuating said braking means, intermediate piston means slidably mounted in said cylinder between said first and second pistons and defining first and second fluid pressure chambers therebetween respectively, means for supplying a high and low fluid pressure to said first and second chambers respectively, said first piston means and said intermediate piston means further defining a third fluid pressure chamber therebetween, valve means in said intermediate piston means normally providing communication between one of said first and second chambers and said third chamber when said high and low fluid pressures are simultaneously applied to said first and second chambers, valve operator means operatively connected to one of said first and second piston means whereby said valve means is closable upon relative movement between said one of said first and second piston means and said intermediate piston upon failure of said high pressure to trap the fluid in said third chamber and provide a fluid link between said first piston means and said intermediate piston means.

2. A wheel cylinder assembly as set forth in claim 1 wherein said first and second piston means are slidably mounted in said cylinder.

3. A wheel cylinder assembly as set forth in claim 1 wherein said first piston means is integral with said cylinder and said second piston means is slidably mounted in said cylinder.

4. A wheel cylinder assembly as set forth in claim 1 wherein said valve means is disposed between said first and third chambers.

5. A wheel cylinder assembly as set forth in claim 1 wherein said valve means is disposed between said second and third chambers.

6. A wheel cylinder assembly as set forth in claim 5 wherein said intermediate piston means is comprised of two parts.

* * * * *